(12) United States Patent
Weh

(10) Patent No.: US 12,384,345 B2
(45) Date of Patent: Aug. 12, 2025

(54) HYDRAULIC BLOCK FOR A HYDRAULIC POWER UNIT OF A HYDRAULIC VEHICLE BRAKING SYSTEM

(71) Applicant: Robert Bosch GmbH, Stuttgart (DE)

(72) Inventor: Andreas Weh, Sulzberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 404 days.

(21) Appl. No.: 17/774,020

(22) PCT Filed: Oct. 28, 2020

(86) PCT No.: PCT/EP2020/080245
§ 371 (c)(1),
(2) Date: May 3, 2022

(87) PCT Pub. No.: WO2021/104783
PCT Pub. Date: Jun. 3, 2021

(65) Prior Publication Data
US 2022/0363231 A1   Nov. 17, 2022

(30) Foreign Application Priority Data

Nov. 28, 2019   (DE) ..................... 10 2019 218 513.4

(51) Int. Cl.
*B60T 13/12* (2006.01)
*B60T 8/40* (2006.01)
(Continued)

(52) U.S. Cl.
CPC ............ *B60T 13/12* (2013.01); *B60T 8/4018* (2013.01); *B60T 8/4031* (2013.01);
(Continued)

(58) Field of Classification Search
CPC ...... B60T 8/4018; B60T 8/4031; B60T 13/12; B60T 13/745; B60T 8/4081
(Continued)

(56) References Cited

U.S. PATENT DOCUMENTS 5,213,482 A * 5/1993 Reinartz ............... F04B 1/0421
417/523
6,171,083 B1 * 1/2001 Schuller ................. F04B 53/20
92/171.1
(Continued)

FOREIGN PATENT DOCUMENTS

CN   101954903 A       1/2011
CN   106414192 A *     2/2017 ............. B60T 8/341
(Continued)

OTHER PUBLICATIONS

WO-2007107391-A1 (Year: 2007).*
(Continued)

*Primary Examiner* — Thomas J Williams
(74) *Attorney, Agent, or Firm* — NORTON ROSE FULBRIGHT US LLP

(57) ABSTRACT

A hydraulic block for a hydraulic power unit of a hydraulic, slipped-controlled power vehicle braking system. A power piston of an electromechanical power brake pressure generator in a power cylinder borehole of the hydraulic block is guided radially in the power cylinder borehole with the aid of a guide bushing.

9 Claims, 1 Drawing Sheet

(51) Int. Cl.
*B60T 13/74* (2006.01)
*B60T 17/02* (2006.01)

(52) U.S. Cl.
CPC ............ *B60T 13/745* (2013.01); *B60T 17/02* (2013.01); *B60T 8/4081* (2013.01)

(58) Field of Classification Search
USPC ........................................................ 303/116.4
See application file for complete search history.

(56) References Cited

U.S. PATENT DOCUMENTS

| | | | | |
|---|---|---|---|---|
| 6,341,950 | B1 * | 1/2002 | Schuller | F04B 53/14 92/172 |
| 6,641,232 | B1 * | 11/2003 | Alaze | B60T 8/4068 417/536 |
| 7,278,835 | B2 * | 10/2007 | Schmitt | B60T 8/4068 417/470 |
| 9,446,753 | B2 * | 9/2016 | Feigel | B60T 13/66 |
| 2017/0313292 | A1 * | 11/2017 | Hanschek | B60T 11/236 |
| 2019/0017502 | A1 | 1/2019 | Ohm et al. | |
| 2022/0363231 | A1 * | 11/2022 | Weh | F04B 9/02 |

FOREIGN PATENT DOCUMENTS

| | | | | |
|---|---|---|---|---|
| CN | 107339232 | A | | 11/2017 |
| CN | 108290562 | A | | 7/2018 |
| CN | 109982907 | A | | 7/2019 |
| DE | 19752546 | A1 * | 9/1998 | ............ B60T 8/4031 |
| DE | 102007048242 | A1 * | 4/2009 | ............ F04B 1/0448 |
| DE | 102015207634 | A1 * | 10/2016 | |
| DE | 102015225712 | A1 | 6/2017 | |
| DE | 102016202113 | A1 | 8/2017 | |
| DE | 102016215726 | A1 | 2/2018 | |
| DE | 102016217971 | A1 | 3/2018 | |
| DE | 102017206289 | A1 | 10/2018 | |
| EP | 1022468 | A2 * | 7/2000 | ............ B60T 8/4031 |
| JP | H039963 | U | 1/1991 | |
| JP | H11217071 | A | 8/1999 | |
| JP | H11512681 | A | 11/1999 | |
| JP | 2014525875 | A | 10/2014 | |
| JP | 2015113033 | A | 6/2015 | |
| JP | 2019116155 | A * | 7/2019 | ............ B60T 13/168 |
| WO | WO-2007107391 | A1 * | 9/2007 | ............ B60T 8/4031 |
| WO | WO-2014019748 | A1 * | 2/2014 | ............ B60T 8/4031 |
| WO | 2017089007 | A1 | 6/2017 | |
| WO | 2019002475 | A1 | 1/2019 | |
| WO | 2019037967 | A1 | 2/2019 | |

OTHER PUBLICATIONS

EP-1022468-A2. (Year: 2000).*
International Search Report for PCT/EP2020/080245, Issued Nov. 27, 2020.

* cited by examiner

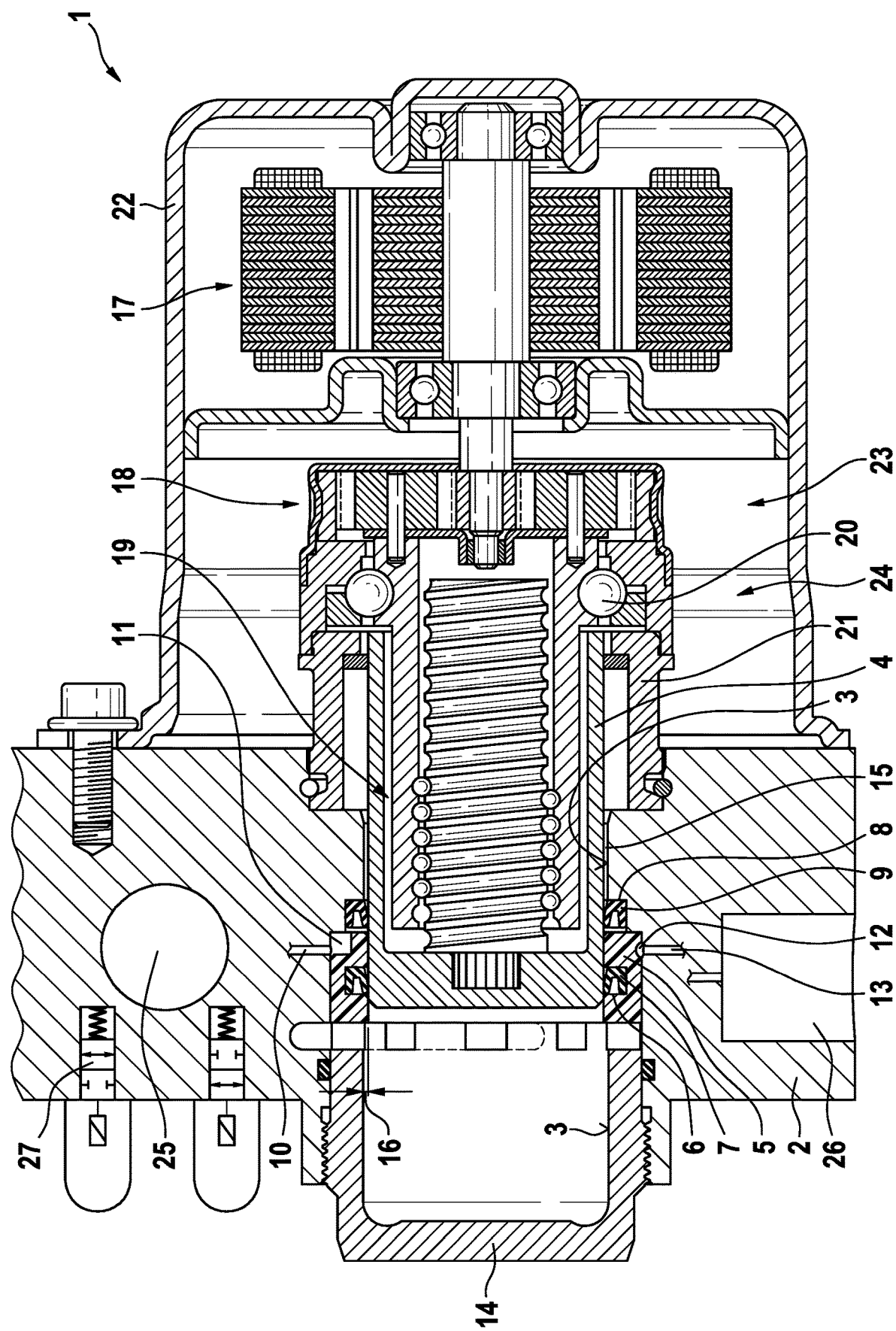

HYDRAULIC BLOCK FOR A HYDRAULIC POWER UNIT OF A HYDRAULIC VEHICLE BRAKING SYSTEM

FIELD

The present invention relates to a hydraulic block for a hydraulic power unit of a hydraulic vehicle braking system, in particular a hydraulic, slip-controlled and/or power vehicle braking system.

BACKGROUND INFORMATION

German Patent Application No. DE 10 2016 202 113 A1 describes a narrow, cuboidal hydraulic block for a hydraulic power unit of a slip-controlled hydraulic power vehicle braking system, in which a master brake cylinder borehole is continuously placed from one to an opposing narrow side, and a power cylinder borehole is also placed continuously through two opposite large sides of the hydraulic block, perpendicular to the master brake cylinder borehole. In addition, the conventional hydraulic block includes a blind hole for accommodating a pedal travel simulator. A cylinder liner, which is closed at one end and protrudes from the hydraulic block on one side and in which a power piston is axially displaceably accommodated, is situated in the power cylinder bore. To generate a brake pressure using external power, the power piston is displaceable by an electric motor via a ball screw in the cylinder liner. The electric motor is situated coaxially to the power cylinder borehole on the outside of the hydraulic block, and the ball screw is situated, also coaxially to the electric motor and to the power cylinder borehole, between the electric motor and the power piston. The electric motor and the ball screw form a power drive and, together with the power piston, the cylinder liner and the power cylinder borehole, form a power brake pressure generator for the hydraulic vehicle braking system.

SUMMARY

A hydraulic power unit according to the present invention is provided for a hydraulic power unit of a hydraulic vehicle braking system, in particular, for a hydraulic power vehicle braking system and/or a slip-controlled vehicle braking system. In accordance with an example embodiment of the present invention, the hydraulic power unit includes an, in particular, cuboidal hydraulic block to which hydraulic wheel brakes of the vehicle braking system are connectable via brake lines. Slip controllers are, in particular, an anti-lock braking unit, a traction control unit and/or a vehicle dynamics control unit/electronic stability program, for which the abbreviations ABS, TCS and/or VDC/ESP are common. The latter are also colloquially referred to as "anti-skid control units." Slip controllers are conventional and are not discussed in greater detail here.

The hydraulic block is used to mechanically attach and hydraulically interconnect hydraulic components of the vehicle braking system or its slip controller. Such hydraulic components are, among other things, solenoid valves, check valves, hydraulic accumulators, damper chambers, and pressure sensors. The hydraulic components are attached in receptacles in the hydraulic block, which are usually designed as cylindrical through-holes or blind holes, partially with stepped diameters. "Interconnected" means that the receptacles or the hydraulic components attached therein are connected by lines in the hydraulic block corresponding to a hydraulic diagram of the vehicle braking system or its slip controller. The lines are typically, but not necessarily, drilled into the hydraulic block.

Equipped with the hydraulic components of the vehicle braking system or its slip controller, the hydraulic block forms the hydraulic power unit, "equipped" meaning that the hydraulic components are fastened in the respective receptacles of the hydraulic block intended for them.

The hydraulic block according to an example embodiment of the present invention includes a power cylinder borehole in which a power piston is axially displaceable, which is often also referred to as a plunger piston. For the radial guidance of the power piston, the hydraulic block according to the present invention includes a guide bushing, which is situated in the power cylinder borehole, encloses the power piston, and guides it axially displaceably in the power cylinder borehole. The present invention enables a, for example, wear-resistant and/or low-friction guidance of the power piston made of a different material than the hydraulic block.

For a brake pressure generation using external power, the power piston is displaceable in the power cylinder borehole, for example, with the aid of an electric motor via a threaded drive or using another rotatory/translatory reverse gear unit. A mechanical reduction gear may be provided between the electric motor and the threaded drive. The electric motor and the threaded drive form an electromechanical power drive for the power piston and, together with the power piston and the power cylinder borehole, form an electromechanical power brake pressure generator, the present invention not precluding power brake pressure generators other than electromechanical power brake pressure generators.

A master brake cylinder borehole in the hydraulic block is not mandatory for the present invention, even though a master brake cylinder borehole is preferably provided in the hydraulic block. The master brake cylinder borehole is provided for one or multiple piston(s) of a master brake cylinder for a muscle power or auxiliary force actuation of the vehicle braking system, i.e., one of the pistons is mechanically displaceable in the master brake cylinder borehole with the aid of a (foot) brake pedal or a (hand) brake lever.

If the hydraulic block includes a master brake cylinder borehole, it preferably also includes a simulator cylinder borehole for a pedal travel simulator in which a simulator piston which is acted upon by a spring or gas pressure, for example, is axially displaceably accommodated. The pedal travel simulator is preferably connected to the master brake cylinder via a solenoid valve, which may also be referred to as a simulator valve, and is used to receive brake fluid from the master brake cylinder borehole when the master brake cylinder is hydraulically disconnected from the vehicle braking system during a power operation of the vehicle braking system by the closing of a separating valve, so that no brake fluid may be displaced from the master brake cylinder into the vehicle braking system. The pedal travel simulator enables a displacement of the master brake cylinder piston during a power actuation of the vehicle braking system.

Through-holes or blind holes referred to here as "boreholes" or as "cylinder boreholes" may also be created in a manner other than boring.

Refinements and advantageous embodiments of the present invention are disclosed here.

All features described herein and of the figure may be implemented in specific embodiments of the present invention either alone or in a generally arbitrary combination. Embodiments of the present invention which do not include all, but only one or multiple features of a specific embodiment of the present invention are generally possible.

BRIEF DESCRIPTION OF THE DRAWINGS

The present invention is described in greater detail hereafter based on one specific embodiment shown in the figure.

FIG. 1 shows a section of a hydraulic block axially through a power cylinder bore of a hydraulic power unit according to an example embodiment of the present invention.

DETAILED DESCRIPTION OF EXAMPLE EMBODIMENTS

Hydraulic power unit 1 according to an example embodiment of the present invention shown in FIG. 1 is provided for a pressure generation in a hydraulic power vehicle braking system including a slip controller. Such slip controllers are, for example, anti-lock braking units, traction control units and/or vehicle dynamics control units/electronic stability programs, for which the abbreviations ABS, TCS and VDC/ESP are common.

Hydraulic power unit 1 according to the present invention includes a hydraulic block 2 for a mechanical attachment and hydraulic interconnection of hydraulic and other components of the slip controller, such as solenoid valves, check valves, hydraulic accumulators and damper chambers. The components are situated at and in hydraulic block 1 and hydraulically connected to one another by a bore of hydraulic block 2, which is not shown, corresponding to a hydraulic diagram of the power vehicle braking system and the slip controller. Two solenoid valves 27 are shown as graphical symbols by way of example.

In the illustrated and described specific embodiment of the present invention, hydraulic block 2 is a cuboidal, flat metal block made up of, for example, an aluminum alloy, which is provided with boreholes for accommodating the components and includes boreholes corresponding to the hydraulic diagram of the vehicle braking system and the slip controller.

Hydraulic block 2 includes a through-hole perpendicular to two large, mutually opposing sides of hydraulic block 2 as a power cylinder borehole 3, in which a power cylinder 4 is axially displaceably accommodated. For an axially displaceable guidance of power piston 4, a guide bushing 5 is axially fixed in power cylinder borehole 3, which radially guides power piston 4 in power cylinder borehole 3.

In the exemplary embodiment, guide bushing 5 is made of plastic. On the outside, guide bushing 5 is sealed by a force fit in power cylinder borehole 3 in hydraulic block 2.

On the inside, guide bushing 5 includes a circumferential sealing groove 6 in which a sealing ring is situated as first piston seal 7. First piston seal 7, which may also be interpreted as a high pressure seal for power piston 4, provides sealing between power piston 4 and guide bushing 5.

An annular step 8 of power cylinder borehole 3 axially adjoins guide bushing 5, with the aid of which power cylinder borehole 3 is reduced to a smaller diameter than in the area of guide bushing 5. Annular step 8 has an axial distance from guide bushing 5, so that a circumferential groove is formed in which a second piston seal 9 is situated, which may also be interpreted as a low pressure seal. Second piston seal 9 is held axially between guide bushing 5 and annular step 8 of power cylinder borehole 3. It provides sealing between power cylinder borehole 3 and power piston 4.

Axially at the height of guide bushing 5, a brake fluid line 10 in hydraulic block 2 opens into power cylinder borehole 3. In the exemplary embodiment, brake fluid line 10 opens into power cylinder borehole 3 between first and second piston seals 7, 9. Guide bushing 5 includes a channel 11, which leads from the opening of brake fluid borehole 10 to a front face of guide bushing 5 which faces annular step 8, so that brake fluid line 10 communicates through channel 11 on a front face facing guide bushing 5 with second piston seal 9. Channel 11, as shown, may, for example, be an axially parallel groove in an outer circumference of guide bushing 5 or a borehole in guide bushing 5 extending from the outer circumference to the front face of guide bushing 5 which faces annular step 8 (not shown). Guide bushing 5 is situated in power cylinder borehole 3 rotated in such a way that its channel 11 communicates with brake fluid line 10. Brake fluid line 10 communicates with a brake fluid reservoir, which is not shown, and causes a lubrication of an outer circumference of power piston 4 in the area of second piston seal 9. During an axial movement, the brake fluid on the outer circumference of power piston 4 also reaches first piston seal 7, so that both piston seals 7, 9 are lubricated.

On the outside, guide bushing 5 includes a circumferential groove 12, which is interrupted at channel 11 and ends on both sides at a distance from channel 11, so that groove 12 does not communicate with channel 11. Brake fluid lines 13, which communicate with one another by groove 12, open axially into power cylinder borehole 3 at the height of groove 12 in the outer circumference of guide bushing 5 at two circumferential points. In this way, the two brake fluid lines 13, which connect hydraulic components of the slip controller of the hydraulic power vehicle braking system to one another, are connected to one another on the outside around power cylinder borehole 3. In the shown exemplary embodiment of the present invention, the two brake fluid lines 13 are situated outside the section plane, which is why one of the two brake fluid lines 13 is shown rotated into the section plane. The other brake fluid line 13 is not visible in the drawing.

Power cylinder borehole 3 extending through hydraulic block 2 is closed at one end by a cup-shaped cylinder cover 14, which in the exemplary embodiment is screwed into power cylinder borehole 3. Fastening with the aid of a spring washer is also possible, for example, which on the outside engages in a circumferential groove on the inside of power cylinder borehole 3, and on the inside engages in a circumferential groove on the outside of cylinder cover 14 (not shown). Cylinder cover 14 protrudes to the outside from hydraulic block 2 and extends power cylinder borehole 3, and thereby a displacement travel of power piston 4.

Cylinder cover 14 is a crown cover including an edge which includes radial slots and by which it holds guide bushing 5 axially in power cylinder borehole 3. Brake fluid may pass through the radial slots.

Outside guide bushing 5, power cylinder borehole 3 has a larger diameter than power piston 4, so that an annular gap 15 exists between power piston 4 and power cylinder borehole 3. Cylinder cover 14 also has a larger inside diameter than power piston 4, so that an annular gap 16 also exists between the power piston and cylinder cover 14 in cylinder cover 14. As a result, power piston 4 is exclusively radially guided in guide bushing 5.

For the displacement of power piston 4 in power cylinder borehole 3 for generating a brake pressure using external power, hydraulic power unit 1 includes an electric motor 17, which displaces power piston 4 via a planetary gear 18 as a reduction gear and a ball screw 19 in power cylinder borehole 3. Ball screw 19 may, generally speaking, also be interpreted as a worm gear or as a rotatory/translatory conversion gear. Ball screw 19 is partially situated in power piston 4 coaxially to power piston 4 and to power cylinder borehole 3, the power piston being designed as a hollow piston for this purpose. Ball screw 19 is mounted with the aid of a ball bearing 20, which is situated with a tubular bearing holder 21 on the outside of hydraulic block 2. Planetary gear 18 is also situated coaxially to power cylinder borehole 3 and to power piston 4, between ball screw 19 and electric motor 17. Electric motor 17 includes a motor housing 22, which is also screwed to the outside of hydraulic block 2 coaxially to power cylinder borehole 3 and to power piston 4. Electric motor 17, planetary gear 18, and ball screw 19 form an electromechanical power drive 23, by which power piston 4 is axially displaceable in power cylinder borehole 3 for generating the brake pressure for the vehicle braking system using external power. Together with power cylinder borehole 3, cylinder cover 14, and power piston 4, power drive 23 forms a power brake pressure generator 24 of hydraulic power unit 1 according to the present invention. The present invention does not preclude a generation of the brake pressure using external power other than the electromechanical generation.

In the illustrated and described specific embodiment of the present invention, hydraulic block 2 includes a master brake cylinder borehole 25, in which a master brake cylinder piston (not shown) is situatable, which is mechanically displaceable via a piston rod with the aid of a foot brake pedal, which is not shown, or a hand brake lever in master brake cylinder borehole 25. Furthermore, hydraulic block 2 includes a simulator cylinder borehole 26 for a simulator piston, which is not shown and, for example, is acted upon by a spring. From master brake cylinder borehole 25, brake fluid is displaceable into simulator cylinder borehole 26 to be able to displace the master brake cylinder piston in master brake cylinder borehole 25 during a power actuation of the vehicle braking system. In addition to power brake pressure generator 24, the vehicle braking system may also be actuated by muscle power by the displacement of the master brake cylinder piston in master brake cylinder borehole 25, which is, in particular, provided in the event of a malfunction or a failure of power brake pressure generator 24.

Power cylinder borehole 3, master brake cylinder borehole 25 and/or simulator cylinder borehole 26 may also be created in a manner other than boring.

What is claimed is:

1. A hydraulic block arrangement for a hydraulic power unit of a hydraulic vehicle braking system, the hydraulic block arrangement comprising:
   a hydraulic block having a power cylinder borehole in which a power piston is axially displaceable; and
   a guide bushing that is situated in the power cylinder borehole in a manner by which the power piston is radially guidable in the power cylinder borehole;
   wherein:
      the guide bushing includes a circumferential sealing groove in its inner circumferential surface, in which a first piston seal is situated, which provides sealing between the power piston and the guide bushing;
      a circumferential groove, which is scored into an exterior surface of the guide bushing, extends in a circumferential direction over a circumferential region of the guide bushing;
      a first plurality of brake fluid lines extend to the circumferential groove;
      each of the first plurality of brake fluid lines opens into the circumferential groove at a respective circumferential coordinate of the circumferential region;
      the respective circumferential coordinates differ from one another; and
      the circumferential groove thereby provides a hydraulic communication between the first plurality of brake lines on the outside of the guide bushing.

2. The hydraulic block arrangement as recited in claim 1, wherein;
   the power cylinder borehole includes an annular step at a front face of the guide bushing, such that a diameter of a first axial region of the power cylinder borehole at a front side of the guide bushing immediately axially adjacent to the front face of the guide bushing is smaller than a diameter of a second axial region of the power cylinder borehole in which the guide bushing is arranged; and
   the hydraulic block arrangement further comprises a second piston seal that is situated in the first axial region, with the guide bushing holding the second piston seal in place in the first axial region.

3. The hydraulic block arrangement as recited in claim 2, wherein:
   the front face of the guide bushing, a radially exterior surface of the power piston, and surfaces of the hydraulic block form walls of a compartment in which the second piston seal is held;
   the first plurality of brake fluid lines open into the second axial region at the exterior surface of the guide bushing, the exterior surface being a radially exterior surface of the guide bushing; and
   the guide bushing includes a channel, which leads from the first plurality of brake fluid lines and opens into the compartment to provide lubrication from the brake fluid lines into the compartment and thereby to a radially interior surface of the second piston seal.

4. The hydraulic block arrangement as recited in claim 2, further comprising:
   a power drive for the power piston situated at an opening of the power cylinder borehole, using which the power piston is displaceable for generating a brake pressure in the power cylinder borehole.

5. The hydraulic block arrangement as recited in claim 2, wherein the hydraulic block includes a master brake cylinder borehole and/or a simulator cylinder borehole.

6. The hydraulic block arrangement as recited in claim 1, wherein:
   the power cylinder borehole passes through the hydraulic block with an opening at a first end of the hydraulic block and an opening at a second end of the hydraulic block that is in an opposite side of the hydraulic block than the first end of the hydraulic block;
   the opening of the power cylinder borehole at the second end of the power cylinder borehole is closed by a cylinder cover, which is partially contained within the hydraulic block and protrudes from the hydraulic block, thereby forming an axial extension to the power cylinder borehole; and
   the cylinder cover and the power cylinder borehole are structured so that the power piston is shiftable within the cylinder cover.

7. The hydraulic block arrangement as recited in claim 6, wherein, outside the guide bushing, an annular gap exists between the power piston and the power cylinder borehole and/or an annular gap exists between the power piston and the cylinder cover.

8. The hydraulic block arrangement as recited in claim 6, further comprising:
   a power drive for the power piston situated at the opening of the power cylinder borehole which is at the first end, using which the power piston is displaceable for generating a brake pressure in the power cylinder borehole.

9. The hydraulic block arrangement as recited in claim 6, wherein the hydraulic block includes a master brake cylinder borehole and/or a simulator cylinder borehole.

\* \* \* \* \*